United States Patent Office 3,325,714
Patented June 13, 1967

3,325,714
CONTROL SYSTEM FOR ELECTRIC CARS USING CONTROLLED RECTIFIER ELEMENTS
Yasunosuke Torii, Musashino-shi, Tokyo, Japan, assignor to Tokyo Shibaura Electric Co., Ltd., Kawasaki-shi, Japan
Filed Dec. 23, 1964, Ser. No. 420,677
Claims priority, application Japan, Dec. 26, 1963, 38/70,395
4 Claims. (Cl. 318—269)

This invention relates to a control system for direct current electric cars and more particularly to a control system utilizing controlled rectifier elements such as silicon controlled rectifier elements to control powering operation, weak field operation and regenerative braking of direct current electric cars.

In direct current electric cars it is usual to connect a starting resistor in series with one or more series motors and to sequentially short circuit successive sections of the resistor by a main controller or contactors under control of a current limiting relay. In order to smoothly accelerate the car without imparting excessive shock to passengers it is necessary to increase the number of resistor sections or decrease the value of resistance between successive notches. This will increase the number of notches of the main controller or the number of contactors and hence the cost of the control apparatus, so that the control apparatus becomes very complex and bulky.

It is also usual to connect a resistor or reactor or combination of them in parallel with the field winding of driving motor and to gradually short circuit this reactor or resistor to gradually decrease field current where it is desired to further increase the speed of the electric car after said series resistor has been complete short circuited. Further in order to provide regenerative braking after powering operation or coasting, the connection of the driving motor is changed from series to shunt connection to cause it to operate as a shunt generator to convert the mechanical energy of the car into electric energy which is fed back to substations or other cars.

Heretobefore different control apparatus or current regulating devices have been used for powering operation, weak field operation and regenerative braking, which is of course expensive and inconvenient. In electric cars where the space for such control apparatus is limited and the weight thereof should be decreased it is highly desirable to simplify as far as possible such a control apparatus.

Accordingly, it is an object of this invention to provide an improved control system for electric cars wherein a single control device is utilized for powering, weak field and regenerative braking operations.

Further object of this invention is to provide a novel current regulator which is utilized for powering, weak field and regenerative braking operations.

Still further object of this invention is to provide a novel current regulator for driving motors of electric cars which can smoothly control current flowing through armature or field winding of the motor without spark and power sumption or IR drop.

Further object of this invention is to provide a current regulator which is compact, light weight, durable and can eliminate mechanical contactors.

In accordance with this invention these objects are attained by providing a control system for an electric car comprising a direct current series motor and a current regulator for said driving motor. The current regulator comprises a main controlled rectifier element, a commutating condenser connected in parallel with the main controlled rectifier element through an auxiliary controlled rectifier element of the same polarity as the main controlled rectifier element, a half wave rectifier of the opposite polarity to those of the main and auxiliary controlled rectifier elements and a reactor connected in series with the half wave rectifier across the auxiliary rectifier element.

The current regulator is connected in series with the driving motor during powering to control current flowing therethrough and in parallel with the field winding of the driving motor during weak field operation to operate the car at a higher speed. According to this invention the same current regulator is also used to control the excitation of the field winding when the motor is connected to a regenerative braking circuit.

The subject matter of the invention is particularly pointed out and distinctly claimed in the concluding portion of the specification. The invention, however, both as to its organization and method of operation, together with further objects and advantages thereof, may best be understood by reference to the following description in connection with the accompanying drawing in which:

Figure 3:
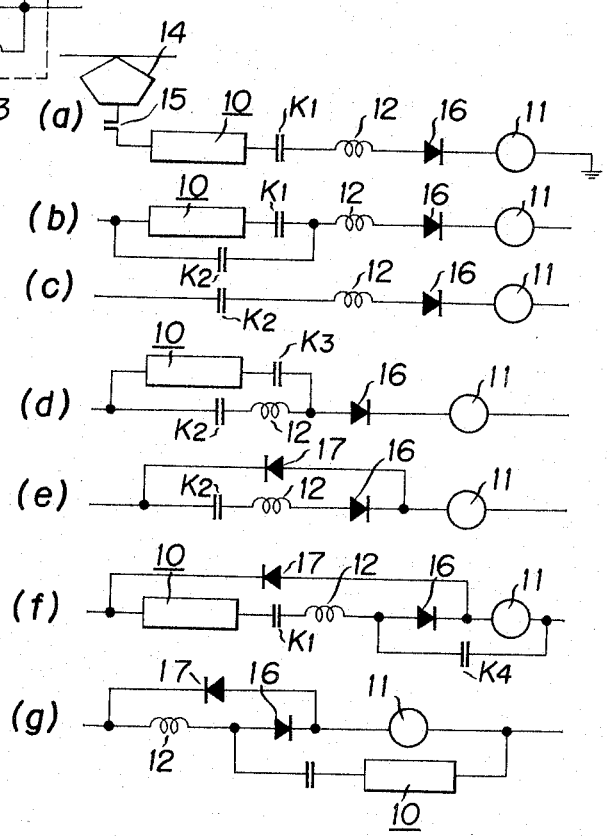
Figure 4:
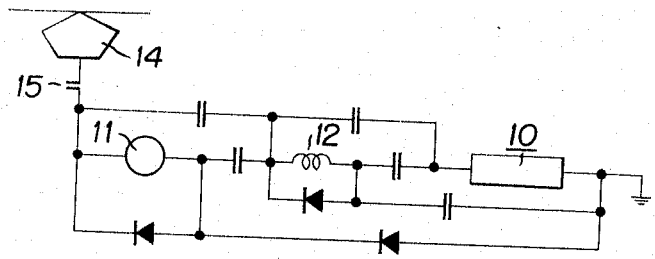
Figure 5:
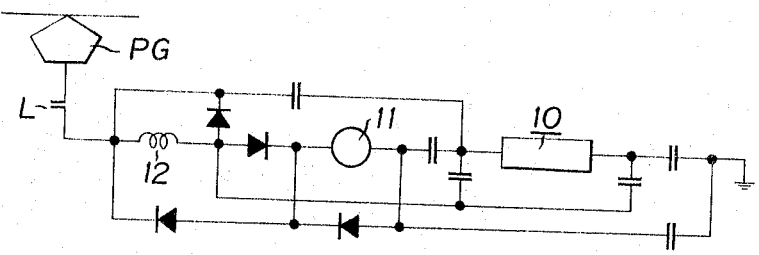

FIGS. 3, wherein sections $a$ to $g$ inclusive show connection diagrams of the main circuit at various stages of powering, weak field and regenerative braking operations; and FIGS. 4 and 5 show schematic connection diagrams, partly in block, of different embodiments of the invention.

Referring now to the accompanying drawing, in FIG. 1 there is shown a connection diagram of the main circuit of a D.C. driving motor for an electric car wherein a current-regulator, the detail thereof being described later, is generally represented by the reference numeral 10. The driving motor is a direct current series motor comprising an armature 11 and a series field winding 12. Current is supplied to the motor from a trolley wire 13 or a third rail (not shown) via a pantograph 14, the circuit interrupter 10 and a blocking rectifier 16. While only one driving motor and only one current regulator have been shown in order to simplify the drawing and description, it should be understood that any required number of driving motors may be utilized corresponding to the number of driving axles and that the motors may be connected in any well known series-parallel combinations. Also it is to be understood that the current regulator may be utilized one for each motor or one for each set of two motors. Where the connection of driving motors is to be transferred from series to parallel connection one current regulator for each set of driving motors, for series powering operation a series combination including one current regulator and one set of motors is connected in series with a similar series combination and for parallel powering operation said two series combinations are connected in parallel. This is effective to decrease the number of controlled rectifier elements which are connected in series in the current regulator as will be more fully described later. Thus, with such a connection each of the two current regulators will share one half of the line voltage at the instant of establishing a series starting circuit or the counter electromotive forces of the driving motors are still substantially zero, and since the counter electromotive forces of the motors will have increased to substantially one half of the line voltage it will become possible to design these current regulators to withstand the one half of the maximum line voltage, thus enabling the number of controlled rectifier elements to be decreased which are required to be connected in series for a given current capacity, so that the cost of the current regulators will be decreased.

As will be explained hereinbelow, to provide the regenerative braking operation, a rectifier 17 adapted to block flow of the powering current is connected between the left hand terminal of the armature and the load side terminal of the current breaker 15.

Also, when required, a discharge rectifier 18 of the polarity as shown in the drawing is connected in parallel with the armature to promptly dissipate the induced electromotive force caused by the self inductance of the armature circuit at the time of stopping powering thus insuring rapid application of regenerative braking. To attain similar purpose a rectifier 19' is connected in parallel with the series field winding 12. A contactor $K_2$ is connected in parallel with a series circuit including the current regulator 10 and a contactor $K_1$ in order to avoid undesirable temperature rise of the controlled rectifier elements included in the current regulator 10 when powering starting is completed, by shunting the current flowing through the current regulator 10. Also a contactor $K_3$ is provided which in cooperation with the contactor $K_2$ operates to connect the current regulator 10 in parallel with the field winding 12 to provide field weakening control. Further a contactor $K_4$ is provided to connect a series circuit including the field winding 12 and the current regulator 10 across the armature 11 to provide regenerative braking.

Figure 2:
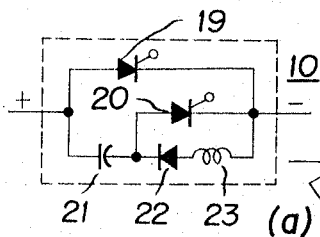
FIG. 2 is a connection diagram of one form of a current regulator constructed in accordance with this invention.

The detail of the current regulator 10 will now be considered by referring to FIG. 2. As shown in this figure, the current regulator 10 comprises a main controlled rectifier element 19 connected to pass the armature current of the motor, such as a silicon controlled rectifier element, and an auxiliary controlled rectifier element 20 which determines the current conduction interval of the main rectifier element. As is well known to those skilled in the art these controlled rectifier elements are characterized by being rendered conductive when a positive pulse is applied to their gate electrodes and continue to conduct current with very small forward resistance until their anode-cathode circuits are opened. To control silicon controlled rectifier elements a commutating condenser 21, a half wave rectifier 22 of the polarity opposite to those of controlled rectifier elements 19 and 20 and a reactor 23 are connected in series across the main controlled rectifier element 19 and the anode electrode of the auxiliary controlled rectifier element 20 is connected to a function between the condenser 21 and the reactor whereas the cathode electrode is connected to the cathode electrode of the main controlled rectifier element 19.

While the current regulator 10 is shown to include only one main controlled rectifier element and one auxiliary controlled rectifier element, it is clear that a plurality of such rectifier elements may be connected in parallel and series relation depending upon the magnitudes of the motor current and of the line voltage. The current regulator is to be connected across the source of DC supply with polarities as indicated in FIG. 2. In operation, the auxiliary controlled rectifier element is rendered conductive at first to charge the commutating condenser 21 to make positive its left hand terminal and negative its right hand terminal. Then the main controlled rectifier element 19 is turned on to pass current to the driving motor at which time the condenser 21 will discharge through the main and auxiliary controlled rectifier elements 19 and 20 to at once turn off the latter. Thereafter the discharge current will flow through the reactor 23 and the half wave rectifier 22. As the series circuit comprising the reactor and the rectifier constitutes an oscillatory circuit the voltage across the reactor will reach its maximum value when the condenser discharges completely. The reactor will act to maintain continuous flow of current until its terminal voltage decreases to zero or the condenser 21 is charged to the maximum voltage of the opposite polarity. Upon completion of charging of the condenser in the opposite direction, this charge will be maintained undischarged owing to non-conductive condition of the auxiliary controlled rectifier element and the polarity of the rectifier 22. Thus, only the main controlled rectifier element 19 will continue to conduct current.

However when a control pulse is applied to the gate electrode of the auxiliary controlled rectifier element 20, this rectifier element will be turned on to discharge the condenser 21 through the main and auxiliary rectifier elements 19 and 20. When the magnitude of the discharge current which flows through the main controlled rectifier element in the reverse direction becomes equal to the magnitude of the forward current flowing through it the main controlled rectifier element will be turned off automatically, thus interrupting the motor current through the current regulator 10. Thereafter similar cycles of operations are repeated indefinitely.

As will be clear from the above description, in the above current regulator, at first the auxiliary controlled rectifier element 20 is turned on to charge the commutating condenser 21, then the main controlled rectifier element 19 is turned on to pass motor current and to charge the condenser 21 to the opposite polarity, and then the auxiliary controlled rectifier element 20 is turned on to turn off the main controlled rectifier element 19 after a predetermined interval of time. Thus, the average value of the motor current flowing through the current regulator 10, or the period of conduction of the main controlled rectifier element 19 is determined by the time interval between the time at which the rectifier element 19 has been turned on and the time at which the auxiliary rectifier element 20 is turned on. Thus by suitable control of the auxiliary controlled rectifier element the average motor current can be adjusted to any desired value without accompanying any power loss due to resistance drop.

Referring again to FIG. 1, to provide powering operation of the electric car the contactor $K_1$ and the circuit interrupter 15 are closed while contactors $K_2$, $K_3$ and $K_4$ are maintained open. As the rectifiers 17, 18 and 19' are of the blocking polarity, the main powering circuit may be simplified to that shown in FIG. 3a, by omitting these rectifiers. The current flowing through the driving motor is controlled by the current regulator in a manner described above. This control of current may be done by a suitable means, not shown, which compares a variable reference voltage derived from a master controller, also not shown, with the value of current flowing through the main circuit to produce output pulses which control the rectifier elements 19 of the current regulator 10 such that to lengthen the conduction period of the main rectifier element 19 when the reference voltage is larger than the motor current and vice versa. In this manner, at the time of starting, the conduction period of the current regulator 10 is made short, then gradually lengthened as the car accelerates, and finally the current regulator is controlled to pass the motor current conttinuously. In other words the voltage impressed upon the driving motor is gradually increased from zero to the time voltage, thus gradually and smoothly accelerating the car without any power loss.

The contact $K_2$ is then closed, as shown in FIG. 3b to short circuit the current regulator 10 to prevent temperature rise of the controlled rectifier elements thereof, this state being shown in FIG. 3c. To further accelerate the electric car contactors $K_2$ and $K_3$ are closed and the contactor $K_1$ is opened, as shown in FIG. 3d, so as to connect the current regulator 10 in parallel with the series field winding 12. Although not shown in the drawing the current regulator 10 is controlled by a suitable control device similar to that employed during previous acceleration stage to gradually increase the current therethrough or to gradually decrease the intensity of field excitation. Thus by using this current regulator the intensity of field excitation can be decreased linearly. The value of shunt current around the field winding is determined by the master controller and it is possible to compare this shunt current and field current to cause the interval of pulses applied to the current regulator to correctly correspond to the value commanded by the master controller. In this manner the electric car can be further accelerated under weak field excitation condition.

After finishing powering or coasting operation the electric car is decelerated by regenerative braking. To provide this operation the contactor $K_2$ and the circuit breaker 15 will be closed and the contactors $K_3$ and $K_4$ are opened, to complete a circuit as shown in FIG. 3c. At this time the excitation of the field winding is temporarily increased to quickly build up the induced voltage of the armature 11 as is well known in the art. Then the contactors $K_1$ and $K_4$ are closed and the contactor $K_2$ is opened with the current regulator 10 adjusted to full conduction state. Thus, as the current regulator is fully conductive the contactor $K_2$ can be opened without any sparking, and a main circuit as shown in FIG. 3f will be established. By varying the current flowing through the field winding 12 by the operation of the current regulator, it is able to linearly control the regenerated current or braking current which is fed back to the trolley wire 13 through the rectifier 17.

Figure 1:
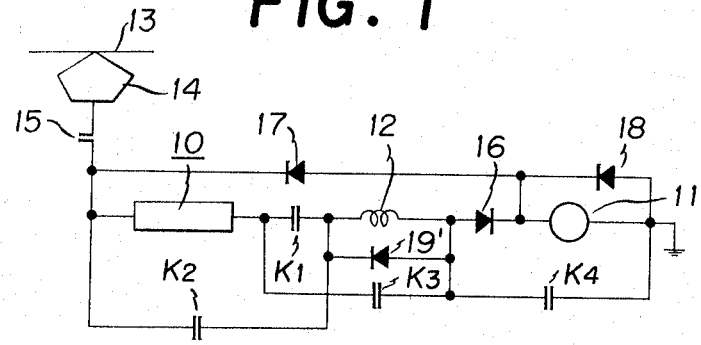
FIG. 1 shows a schematic connection diagram, partly in block, of the main circuit of a control system for an electric car embodying this invention.

FIG. 4 shows another embodiment of this invention which is substantially identical to that shown in FIG. 1 except that the current regulator 10 is included in the ground side of the driving motor. This connection is preferable because an excessive ground fault current does not pass through the current regulator caused by flash over fault of the driving motor.

FIG. 5 shows a modification of FIG. 4 wherein various contactors are arranged so that regenerative braking can be immediately applied without opening the motor circuit. The connection of the main circuit at the time of regenerative braking is shown in FIG. 3g.

As will be clear from the above description this invention provides a novel control system for electric cars utilizing a current regulator which does not include any resistor and hence any movable parts thus enabling smooth and rapid acceleration and/or deceleration of the cars without any power consumption or IR drop which is inherent to ordinary starting resistors. Moreover as the current regulator acts to control the current in a stepless manner so that it can control the speed of the electric car very smoothly which is equivalent to control provided by a mechanical controller provided with an infinite number of notches. Moreover the control system embodying this invention is very economical, light weight and compact because a single current regulator is utilized for powering, weak field and regenerative braking operations.

While the invention has been described by illustrating some preferred embodiments thereof it should be understood that many modifications may be made therein without departing from the true spirit and scope of the invention as defined in the appended claims.

What is claimed is:

1. A control system for an electric car utilizing a current regulator arrangement comprising a direct current driving motor for said car, and a current regulator for controlling said driving motor, said current regulator including a main controlled rectifier element, a series circuit including a commutating condenser and an auxiliary controlled rectifier element having the same polarity as said main controlled rectifier element and connected in parallel with said main controlled rectifier element, a half wave rectifier of the opposite polarity to those of said main and auxiliary controlled rectifier elements and reactance means connected in series with said half wave rectifier across said auxiliary rectifier element.

2. The control system for an electric car utilizing a current regulator according to claim 1 wherein said driving motor is a direct current series motor, and means connecting said current regulator in series with said driving motor which gradually increases the current flowing through said motor.

3. The control system for an electric car utilizing a current regulator according to claim 1 wherein said driving motor is a direct current series motor and means connecting said current regulator in parallel with the field winding of said driving motor which gradually decreases the current flowing therethrough during weak field operation of said motor.

4. The control device for an electric car utilizing a current regulator according to claim 1 including regenerative braking contact means, said means connecting said current regulator in series with the field winding of said motor and connecting said half wave rectifier in parallel with a series circuit including the current regulator and the field winding, so as to feed back the current generated by said motor to an electric trolley wire without passing through said field winding and said current regulator.

References Cited

UNITED STATES PATENTS

| | | | |
|---|---|---|---|
| 1,840,281 | 1/1932 | Wright | 318—247 |
| 2,144,575 | 1/1939 | Murphy | 318—376 |
| 3,187,246 | 6/1965 | Garten | 318—247 |

OTHER REFERENCES

Menard et al.: Switch Voltage Regulator, IBM Technical Disclosure, Vol. 6, No. 8, January 1964, page 31.

BENJAMIN DOBECK, *Primary Examiner.*

ORIS L. RADER, *Examiner.*